US012578237B2

(12) United States Patent
Strei et al.

(10) Patent No.: US 12,578,237 B2
(45) Date of Patent: Mar. 17, 2026

(54) PROCESS VARIABLE TRANSMITTER WITH CRYOGENIC TEMPERATURE SENSOR

(71) Applicant: Rosemount Inc., Shakopee, MN (US)

(72) Inventors: David M. Strei, Waconia, MN (US);
Nicholas E. Meyer, Victoria, MN (US);
David J. Hillman, Prescott, WI (US)

(73) Assignee: ROSEMOUNT INC., Shakopee, MN (US)

( * ) Notice: Subject to any disclaimer, the term of this patent is extended or adjusted under 35 U.S.C. 154(b) by 383 days.

(21) Appl. No.: 18/477,759

(22) Filed: Sep. 29, 2023

(65) Prior Publication Data

US 2025/0109992 A1 Apr. 3, 2025

(51) Int. Cl.
*G01K 7/18* (2006.01)
*G01K 1/024* (2021.01)
(Continued)

(52) U.S. Cl.
CPC ............. *G01K 7/183* (2013.01); *G01K 1/024* (2013.01); *G01K 7/22* (2013.01); *G01K 13/006* (2013.01);
(Continued)

(58) Field of Classification Search
CPC .......... G01K 7/183; G01K 1/024; G01K 7/22; G01K 2203/00; G01K 13/006; G01K 13/008
See application file for complete search history.

(56) References Cited

U.S. PATENT DOCUMENTS

| | | | | |
|---|---|---|---|---|
| 3,436,713 A | * | 4/1969 | Di Noia | G01K 1/08 |
| | | | | 374/176 |
| 3,575,053 A | * | 4/1971 | Telinde | G01K 7/20 |
| | | | | 73/766 |

(Continued)

FOREIGN PATENT DOCUMENTS

CN      110431386 A      11/2019

OTHER PUBLICATIONS

International Search Report and Written Opinion for corresponding International Application No. PCT/US2024/046722, dated Jan. 2, 2025, 11 pages.

(Continued)

*Primary Examiner* — Laura Martin
*Assistant Examiner* — Philip L Cotey
(74) *Attorney, Agent, or Firm* — Westman, Champlin & Koehler, P.A.

(57) ABSTRACT

A process variable transmitter for sensing a cryogenic temperature in an industrial process includes a cryogenic temperature sensor configured to be thermally coupled to an industrial process. The cryogenic temperature sensor has an electrical resistance which changes in response to changes in a cryogenic temperature and the industrial process is at the cryogenic temperature. Resistance measurement circuitry is electrically coupled to the cryogenic temperature sensor and measures a sensor resistance over a resistance range and responsively provides an output related to temperature based upon the measured resistance. Transmitter output circuitry coupled to the measurement circuitry to transmits information related to the cryogenic temperature to a remote location. The cryogenic temperature sensor comprises a polycrystalline silicon sensor including a dopant such that the cryogenic temperature sensor has an electrical resistance which changes over a cryogenic temperature range which is (Continued)

Comparison of the resistance ratio for polysilicon to other cryogenic RTDs within the sensor resistance range of the measurement circuitry.

26 Claims, 7 Drawing Sheets

(51) Int. Cl.
  G01K 7/22          (2006.01)
  G01K 13/00          (2021.01)
(52) U.S. Cl.
  CPC ....... G01K 13/008 (2013.01); *G01K 2203/00* (2013.01)

(56)                References Cited

U.S. PATENT DOCUMENTS

| | | | | |
|---|---|---|---|---|
| 4,140,989 A | * | 2/1979 | Baixeras | G01K 7/223 |
| | | | | 252/521.5 |
| 4,506,996 A | * | 3/1985 | Nara | G01K 7/006 |
| | | | | 374/176 |
| 4,791,585 A | * | 12/1988 | Maki | G01K 11/3213 |
| | | | | 702/135 |
| 5,389,792 A | * | 2/1995 | DiMarzio | G01T 1/36 |
| | | | | 257/E27.008 |
| 6,165,265 A | * | 12/2000 | Gris | H01L 21/02532 |
| | | | | 117/913 |
| 6,292,089 B1 | * | 9/2001 | Andersson | G01J 5/20 |
| | | | | 257/E27.008 |
| 6,356,191 B1 | * | 3/2002 | Kirkpatrick | G08C 19/02 |
| | | | | 702/53 |
| 7,658,539 B2 | * | 2/2010 | Engelstad | G01K 7/16 |
| | | | | 374/185 |
| 11,035,709 B2 | * | 6/2021 | De Luca | G01L 9/0054 |
| 2004/0217845 A1 | * | 11/2004 | Silver | G01K 7/223 |
| | | | | 338/25 |
| 2007/0013014 A1 | | 1/2007 | Guo et al. | |
| 2011/0254653 A1 | * | 10/2011 | Radamson | G01J 5/046 |
| | | | | 438/54 |
| 2015/0211942 A1 | * | 7/2015 | Saraie | G01K 13/006 |
| | | | | 374/185 |
| 2020/0049539 A1 | * | 2/2020 | De Luca | H01L 23/481 |
| 2022/0174228 A1 | * | 6/2022 | Carr | H04N 23/23 |

OTHER PUBLICATIONS

"Determination of Electrical Properties of n-Type and p-Type Polycrystalline Silicon Thin Films as Sensor Materials", by H. Muro et al., Sensors and Materials, vol. 18, No. 8, (2006), pp. 433-444.
"Stability of Certnox Resistance Temperature Sensors", by SS. Courts et al. , Presented at CEC/ICMC, 1999, pp. 1-9.
Pressure Sensor for Transducers, Strain Measurement Devices, ISO9001; ISO13485, 3 pgs.

* cited by examiner

PROCESS VARIABLE TRANSMITTER WITH CRYOGENIC TEMPERATURE SENSOR

BACKGROUND

The present invention relates to process variable transmitters used in process control and monitoring systems. More specifically, the present invention relates to a process variable transmitter having a cryogenic temperature sensor.

The process industry employs process variable transmitters to monitor process variables associated with substances such as solids, slurries, liquids, vapors, and gasses in chemical, pulp, petroleum, pharmaceutical, food and other food processing plants. Process variables include pressure, temperature, flow, level, turbidity, density, concentration, chemical composition and other properties. A process fluid temperature transmitter provides an output related to a sensed process substance temperature. The temperature transmitter output can be communicated over a process control loop to a control room, or the output can be communicated to another process device such that the process can be monitored and controlled. In order to monitor a process fluid temperature, the transmitter includes a sensor, such as a resistance temperature device (RTD).

An RTD changes resistance in response to a change in temperature. By measuring the resistance of the RTD, temperature can be calculated. Such resistance measurement is generally accomplished by passing a known current through the RTD, and measuring the associated voltage developed across the RTD.

Microprocessor-based transmitters include a sensor, an analog-to-digital converter for converting an output from a sensor into a digital format, a microprocessor for compensating the digitized output and an output circuit for transmitting the compensated output. Typically, this transmission is over a process control loop, such as a 4-20 mA current loop.

Temperature is measured by converting the sensor output (resistance to voltage) to an output indicative of temperature of the sensor. However, in order for the process variable transmitter to obtain the desired measurement, the circuitry of the transmitter must be properly calibrated. For example, typical RTD sensors exhibit only a small resistance change in a response to a change in temperature when operating at cryogenic temperatures. It can therefore be difficult to accurately measure small changes in temperature at low temperatures.

SUMMARY

A process variable transmitter for sensing a cryogenic temperature in an industrial process includes a cryogenic temperature sensor configured to be thermally coupled to an industrial process. The cryogenic temperature sensor has an electrical resistance which changes in response to changes in a cryogenic temperature and the industrial process is at the cryogenic temperature. Resistance measurement circuitry is electrically coupled to the cryogenic temperature sensor and measures a sensor resistance over a resistance range and responsively provides an output related to temperature based upon the measured resistance. Transmitter output circuitry coupled to the measurement circuitry to transmits information related to the cryogenic temperature to a remote location. The cryogenic temperature sensor comprises a polycrystalline silicon sensor including a dopant such that the cryogenic temperature sensor has an electrical resistance which changes over a cryogenic temperature range which is within the sensor resistance range of the measurement circuitry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

In many industrial processes, advancements are being made to employ non-$CO_2$ producing alternate energy sources. Hydrogen is one possible alternative fuel that is being used. Hydrogen may be stored as either a compressed gas or as a cryogenic liquid. The temperature of liquid hydrogen is approximately 20 K. As storage tanks and liquid hydrogen generating facilities are built, there is a need for industrial process temperature transmitters with a cryogenic temperature sensors capable of accurate measurements. Further, it is desirable that such sensors can be retrofit such that they can be used without significant modification to existing process temperature transmitters.

Figure 1:
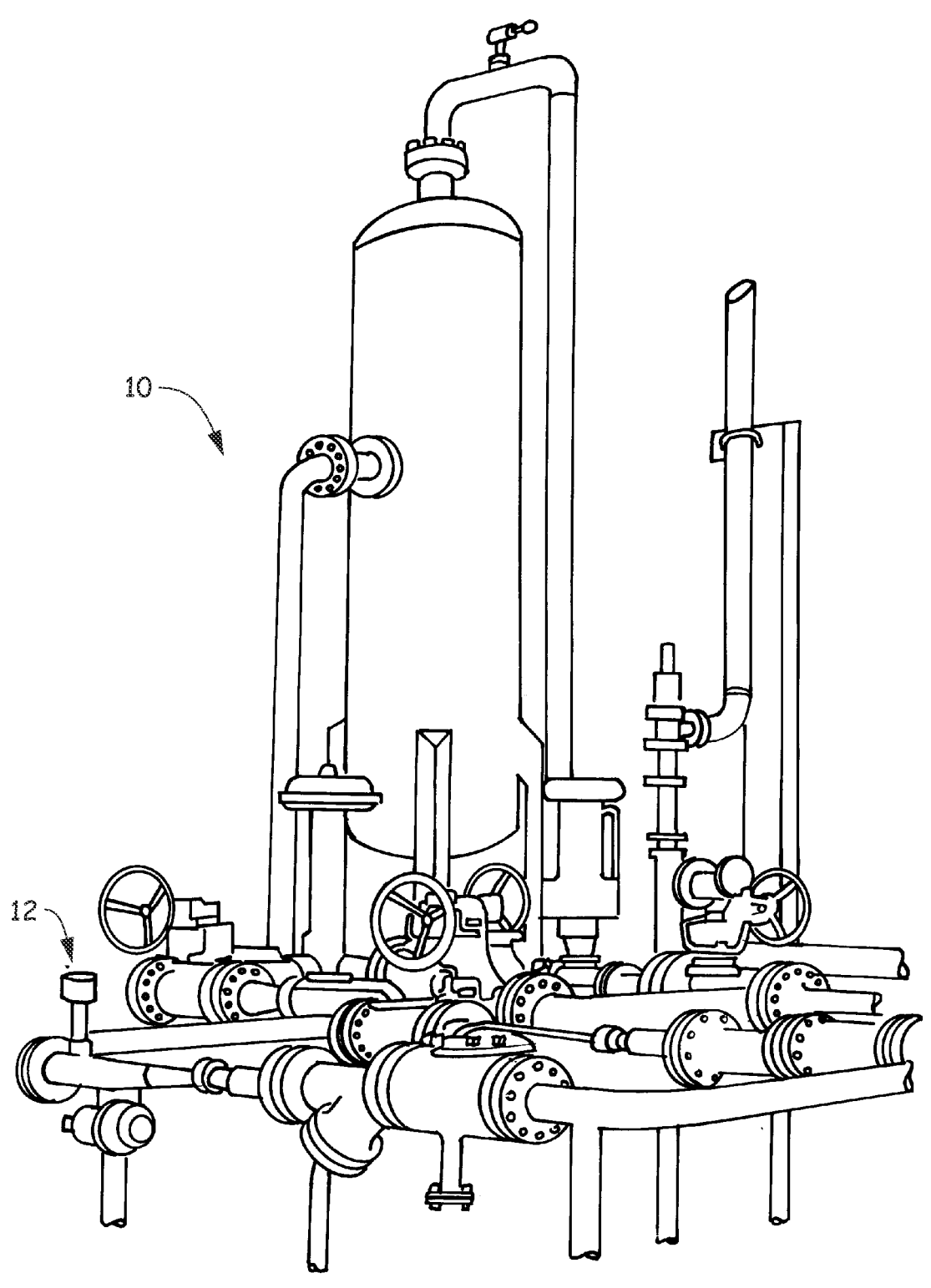
FIG. 1 is a diagram of the environment of a process fluid temperature transmitter.
Figure 2:
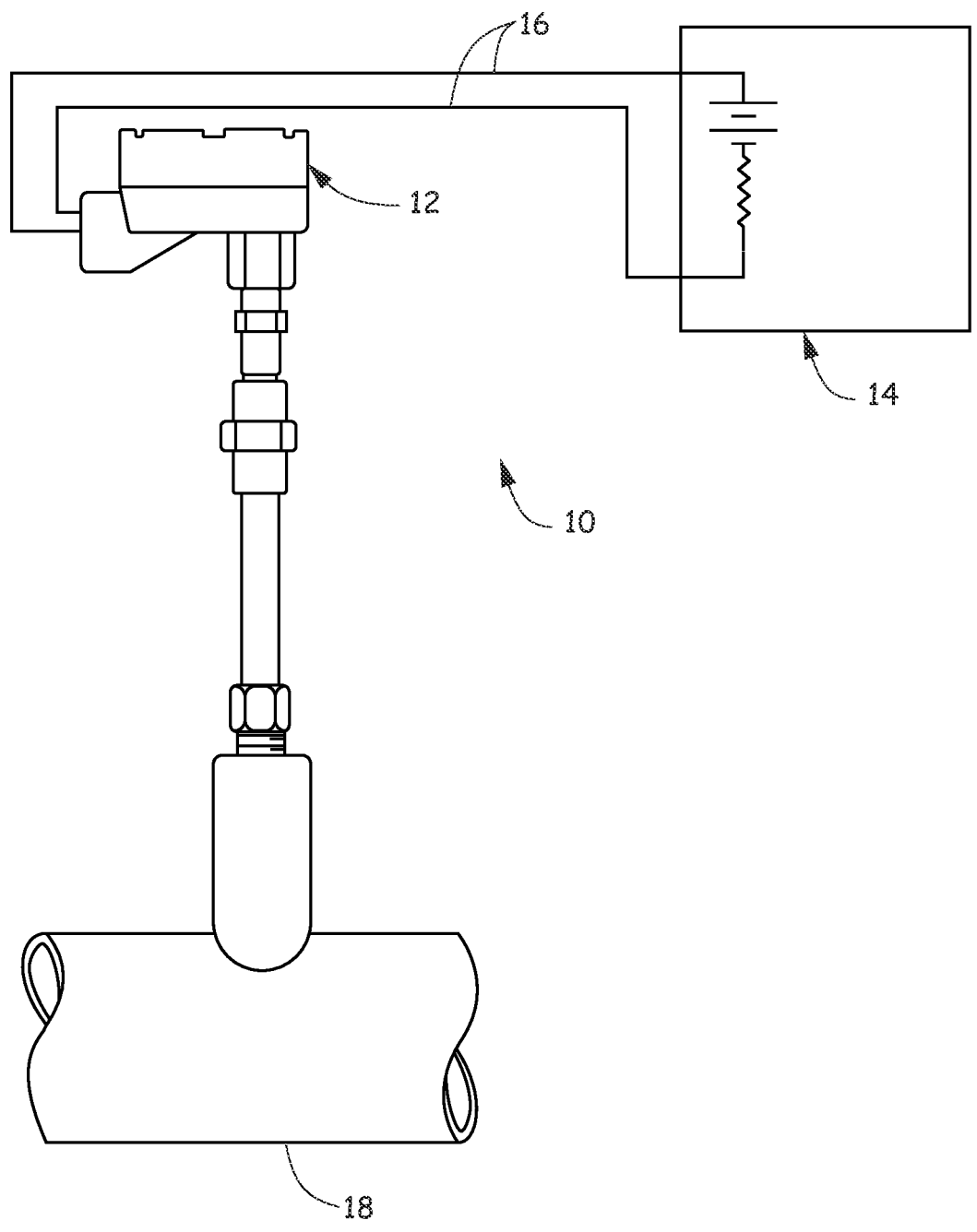
FIG. 2 is a diagrammatic view of process fluid temperature transmitter.

FIGS. 1 and 2 illustrate the environment of a process fluid temperature transmitter in accordance with embodiments of the invention. FIG. 1 shows process fluid control system 10 including process fluid temperature transmitter 12. FIG. 2 illustrates process control system 10 including process fluid temperature transmitter 12 electrically coupled to control room 14 (modeled as a voltage source and resistance) over a process control loop 16. Transmitter 12 is mounted on and coupled to a process fluid container, such as pipe 18. Transmitter 12 monitors the temperature of process fluid in process pipe 18 and transmits temperature information to control room 14 over loop 16.

Figure 3:
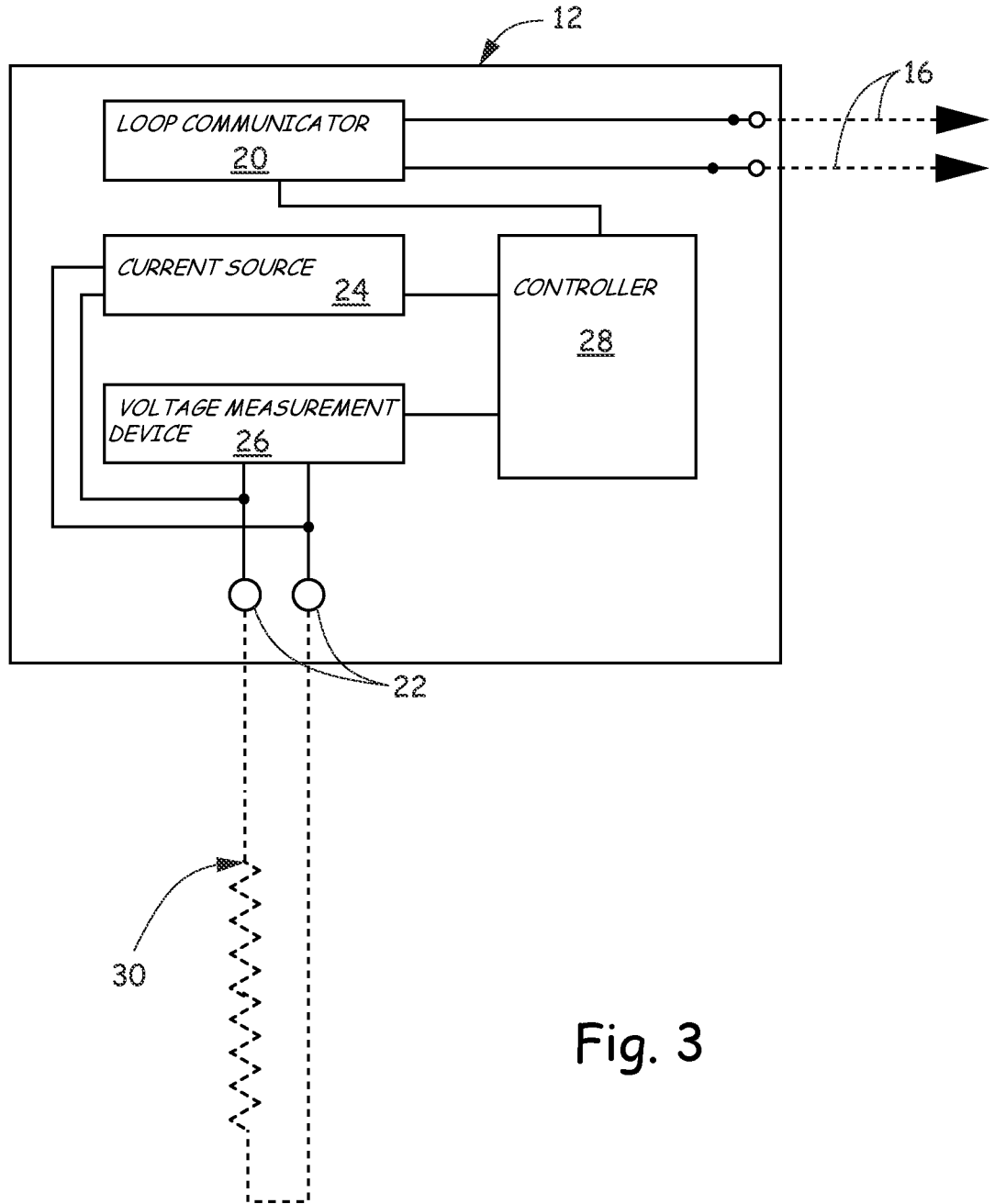
FIG. 3 is a system block diagram of a process fluid temperature transmitter.

FIG. 3 is a system block diagram of process fluid transmitter 12 in accordance with an embodiment of the invention, Process fluid temperature transmitter 12 includes loop communicator 20, a plurality of terminals 22, current source 24, voltage measurement device 26, and controller 28. FIG. 3 also shows an RTD (Resistance Temperature Device) 30. As discussed herein, this can be a traditional RTD fabricated from Platinum, Copper and Nickel, or a polycrystalline cryogenic temperature sensor in accordance with the present invention.

Loop communicator 20 is couplable to process control loop 16 (shown in phantom) and is adapted to communicate over process control loop 16. Process control loop 16 is any physical configuration that is capable of passing signals related to process information. For example, process control loop 16 can be a two-wire, 4-20 mA process control loop. A process variable transmitter coupled to such a process control loop controls the amount of current flowing through the loop such that the current corresponds to the process variable. Some process variable transmitters can operate on such low energy levels that they can receive all required electrical power from a 4-20 mA process control loop.

Loop communicator 20 can include a 4-20 mA communication section for analog communication. For digital signals, communicator 20 can include a Highway Addressable Remote Transducer (HART®) communication section, a FOUNDATION™ Fieldbus communication section, or any other appropriate section such as a Profibus section, a Controller Area Network (CAN) section, a DeviceNet section, or a Lonworks section. Additionally, various sections can be included together. For example, a 4-20 mA section can be combined with a HART® section to provide both analog and digital communication. Thus, loop communicator 20 is adapted for bi-directional communication over process control loop 16 according to one or more selected protocols in a known manner.

Process control loop 16 can comprise any operable number of conductors. For example, process control loop 16 can be a two-, three-, or four-conductor process control loop. The conductors themselves can be electrical wires, or fiber-optic media. Further, if a wireless process control loop is to be used (such as an infrared (IR) loop or a radio-frequency (RF) loop) then the conductors can be omitted and the adaptation of loop communicator 20 for such wireless communication can be affected in a known manner. For example, WirelessHART® in accordance with IEC 62591 provides such wireless communication.

FIG. 3 shows a pair of terminals 22 coupled to a resistance temperature device, such as RTD 30 (shown in phantom in FIG. 3). Although FIG. 3 shows a pair of terminals 22, any appropriate number of terminals can be used to couple to temperature sensor 30. Sensor 30 can be separate from transmitter 12 (as shown) or included within transmitter 12.

Current source 24 is operably coupled to terminals 22 and is adapted to pass a measurement current through the plurality of terminals. Passing a known measurement current through an unknown resistance causes an associated voltage drop across the resistance that is indicative of the resistance. Current source 24 is shown in block form, and can be any current source that provides a known current output. Thus, current source 24 can include an unknown current source adapted to pass its current through a known resistor such that the current can be known. Alternately, current source 24 can be a known semiconductor current source or any other appropriate current source.

Voltage measurement device 26 is coupled to terminals 22 and is adapted to provide a voltage value indicative of a voltage across terminals 22. Voltage measurement device 26 can be an analog to digital converter, or any other appropriate device capable of measuring the voltage across terminals 22. If such measurement is performed while current source 24 is passing the measurement current through sensor 30, then the voltage measured will be related to the resistance of sensor 30, and thus the process fluid temperature.

Controller 28 is coupled to voltage measurement device 26 and loop communicator 20. Controller 28 is adapted to provide a process temperature output value to loop communicator 20 for communication over process control loop 16. The process temperature output value is related to the measured resistance of the temperature sensor 30. Controller 28 can be a programmable gate array, microprocessor, or any other suitable device.

Figure 4:
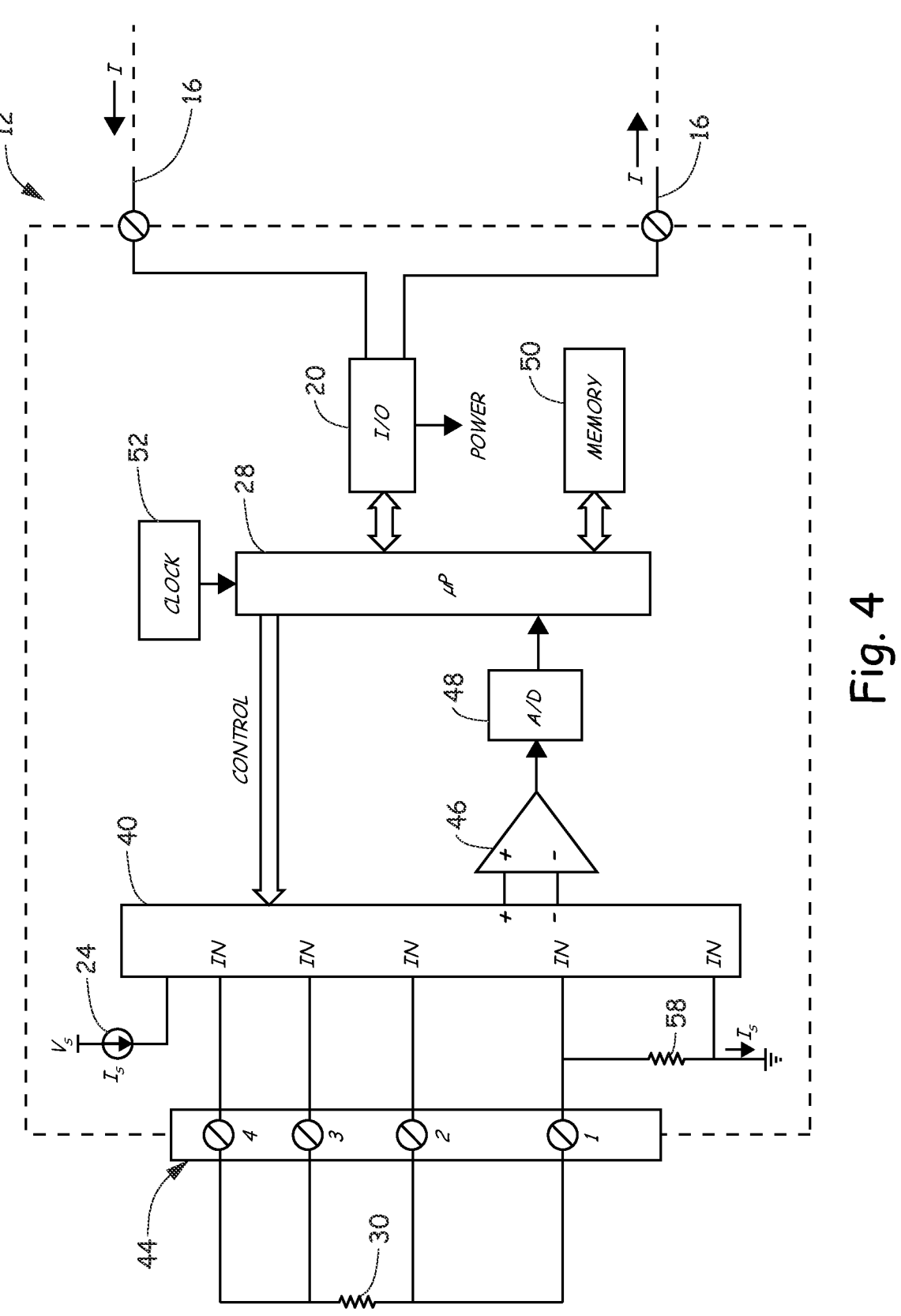
FIG. 4 is a more detailed block diagram of the process fluid temperature transmitter.

FIG. 4 is a more detailed block diagram of temperature transmitter 12 connected to measure temperature with a temperature sensor 30. In this embodiment, transmitter 12 includes a terminal block 44 having terminals 1 through 4 for coupling to temperature sensor 30. Transmitter 12 includes multiplexer 40 controlled by microprocessor (controller) 28 which is coupled to control loop 16 through input/output (I/O) circuitry (loop communicator) 20. Multiplexer 40 multiplexes appropriate sets of analog signals, including signals from terminals 1 through 4, to positive and negative inputs of differential amplifier 46, which connects to high accuracy A/D converter 48. Memory 50 stores instructions and information for microprocessor 28, which operates at a speed determined by clock 52. Multiplexer 40 selectively connect input pairs to the positive and negative inputs of differential amplifier 46. A reference resistance $R_{REF}$ 58 couples to multiplexer 40 and is connected in series with sensor 30. The use of two connections for a current source and two connections for a voltage measurement, as illustrated in FIG. 4, is known as a Kelvin connection and helps reduce measurement errors due to wiring resistance. However, a two-wire connection may also be used, such as is illustrated in FIG. 3.

In operation, transmitter 12 measures temperature of sensor 30 and transmits a representation of temperature over control loop 16. Transmitter 12 employs the following equation to compute the major value of temperature of sensor 30.

$$R_{INPUT} = \frac{V_{RINPUT}}{V_{RREF}}(R_{REFNOM}) \qquad \text{Equation 1}$$

where:
$R_{REFNOM}$ the nominal measured resistance of the reference resistance 58 in ohms, and/or stored in memory 50;
$V_{RINPUT}$ voltage drop across the input; and
$V_{RREF}$ voltage drop across $R_{REF}$ Current source 24 provides current Is through sensor 30 (via terminals 1 and 4) and reference resistor 58 through MUX 40. In the configuration of FIG. 4, microprocessor 28 measures the voltage drop ($V_{RINPUT}$) across sensor 30 between terminals 2 and 3, and the voltage drop ($V_{RREF}$) across resistor 58 with MUX 40. $R_{REFNOM}$ is a calculation constant and is retrieved from memory 50. In a four-wire resistance measurement such as this, the voltage drop across the connections to terminals 2 and 3 is largely eliminated, because substantially all the current flows between terminals 1 and 4, and has little impact on the accuracy of the measurement. RINPUT is converted to temperature units with a look-up table or suitable equation stored in memory 50. The current source 24 and voltage measurement device provide resistance measurement circuitry which is configured to measure resistance over a sensor resistance range tailored to standard RTD (Resistance Temperature Device)

temperature ranges. Typical metals used in such RTDs include Platinum, Copper and Nickel.

The issue many people in the liquid hydrogen industry are facing is there are no combinations of temperature sensors and transmitters that will work at cryogenic temperatures such as 20 K. Typical RTD sensors fabricated from Copper, Platinum or Copper are not accurate at such temperatures. Other types of sensors require modifications to the circuitry of existing process temperature transmitters.

Silicon diodes are one of the most common temperature sensors used at cryogenic temperatures. Silicon diodes have a voltage output that increases as temperature decreases. Unfortunately, at 20 K the voltage output of a silicon diode temperature sensor is too high for many temperature transmitters.

Many positive temperature coefficient resistance temperature sensors (PTC RTDs) used for cryogenic temperatures (such as the PT100 industrial PRT and Rhodium-Iron RTD) lose sensitivity at low temperatures, resulting in low resolution. Negative temperature coefficient resistance temperature (NTC RTDs) sensors, such as a germanium RTD, do not have this issue. However, to be used with temperature transmitter 12, an RTD must also have a resistance value within the measurement capabilities of the transmitter for the particular temperature range of interest. For example, 0-2000 ohms is a typical resistance measurement range for a temperature transmitter. This is problematic for NTC RTDs whose resistance increases exponentially as temperature decreases. Further, packaging of cryogenic RTD elements has typically been done using either metal cans or ceramic packaging, both of which are expensive because they must be done on an individual sensor instead of at the wafer level used to batch produce the sensors themselves.

Poly-Si (polycrystalline silicon) is a common material used in MEMs (Micro-electromechanical systems) sensors. They are cost effective and can be made at high volume using wafer-level processing. In a MEMs pressure sensor, the piezoresistive properties of poly-Si can be utilized in a Wheatstone bridge circuit manufactured on a crystalline silicon diaphragm. As the crystalline silicon diaphragm is deformed by pressure, the output of the Wheatstone bridge increases. The Wheatstone bridge output is measured by the transmitter electronics.

Several electrical characteristics of poly-Si can be controlled by modifying the doping levels. Three electrical characteristics of poly-Si that vary by both doping levels and temperature are resistivity, TCR (temperature coefficient of resistivity), and gauge factor (a measure of the piezoresistive properties). It is known that these properties vary with temperature and doping levels. (see, *Determination of Electrical Properties of n-Type and p-Type Polycrystalline Silicon Thin Films as Sensor Materials* (Sensors and Materials, Vol. 18, No. 8 (2006) 433-444).)

With the present invention, a polysilicon resistor is manufactured on a single crystal silicon substrate with the doping level and dimensions optimized to provide high sensitivity to temperature and minimum sensitivity to mounting and packaging effects at cryogenic temperatures between 3 and 50 K. However, the temperature range can be extended to 298 K, and, in some embodiments, to 473 K. This is beyond the range of typical cryogenic temperature sensors. Further, the doping is such that the sensor has a resistance range over its operating temperature which is within the operating range of the circuitry of transmitter 12 as determined by a typical RTD based temperature sensor. For example, this may be between 0 and 2000 ohms.

The design of the poly-Si temperature sensor requires simultaneously optimizing the dimensions of the resistors, the resistor network, and the doping level of the polysilicon. In one configuration, the dopant material is phosphorous. In another configuration the dopant is selected from the group of dopants consisting of arsenic, antimony, bismuth and lithium. In another example, the dopant is selected from the group of dopants consisting of boron, aluminum, gallium and indium. The sheet resistivity of the polysilicon can be monitored, and the resistivity inversely varies with dopant level. For example, a range of possible polysilicon temperature sensors can be manufactured with sheet resistivity of between 15 Q/sq and 3,500 Q/sq. In this example, a 15 Q/sq sheet resistance correlates with a very high concentration of a phosphorus dopant, while 3,500 Q/sq correlates with a very low concentration of the phosphorus dopant.

The low sheet resistance of 15 Q/sq can result in a temperature sensor with a positive temperature coefficient, while a sheet resistance of 3,500 Q/sq can provide a negative temperature coefficient device. Varying the sheet resistance (by changing the amount of phosphorus added to the polysilicon) between these values can provide a temperature coefficient anywhere within this spectrum.

The polysilicon temperature sensors are arranged as a Wheatstone circuit having a bridge resistance which correlates to the temperature of the sensor. The temperature coefficient of resistance for the sensors can be controlled by adjusting the sheet resistivity such that the overall resistance of the sensor is varied by adjusting the sheet resistance. To compare sensor performance, the ratio of the resistance (R) at temperature to the resistance in an ice bath (Ro) was used.

Figure 5:
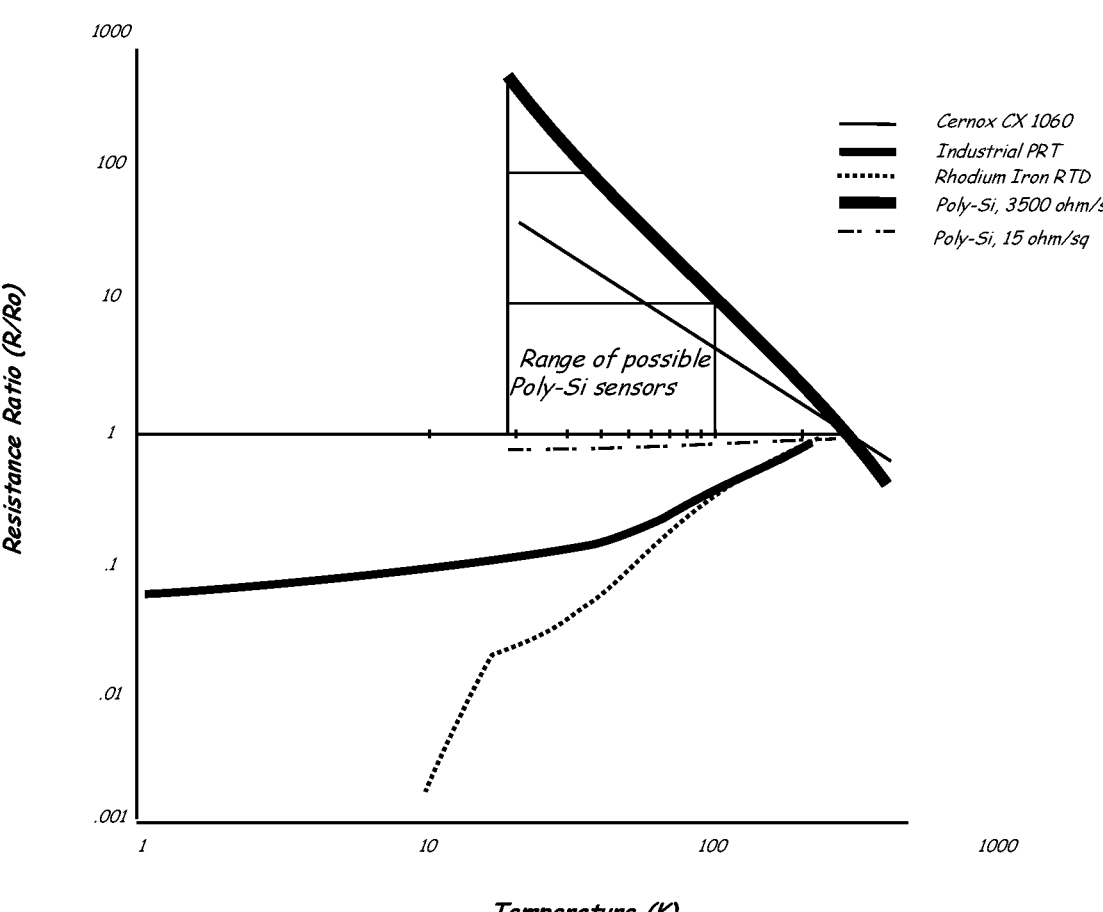
FIG. 5 is a graph of electrical resistance vs. temperature for different temperature sensors.

FIG. 5 shows the resistance ratio for the example doped polysilicon sensors compared to other available RTD sensors for cryogenic applications. Note the slope of the lines is equivalent to the sensitivity of the sensor. As the sheet resistivity of polysilicon can be adjusted between 15 and 3500 Q/sq, the gray triangle in FIG. 5 outlines the range of possible sensors that can be made using polysilicon. The sensitivity for polysilicon sensors can range from low sensitivity (for 15 Q/sq polysi) to more sensitive than a typical RTD sensor.

These individual sensors have a Ro value that is too high to be used with temperature transmitter 12. In order to lower the Ro value, a new resistor network is provided.

Figure 6:
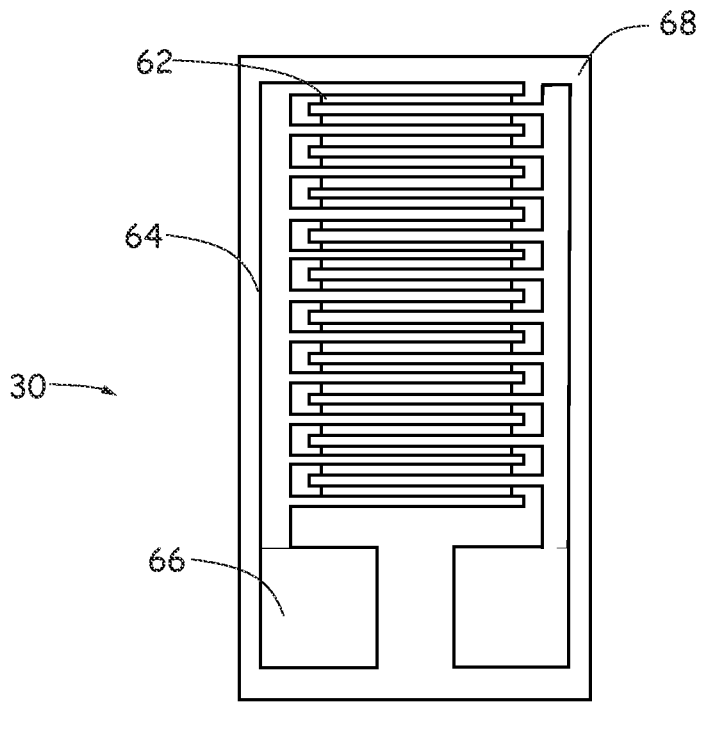
FIG. 6 is a plan view of a cryogenic temperature sensor in accordance with one embodiment.
Figure 7:
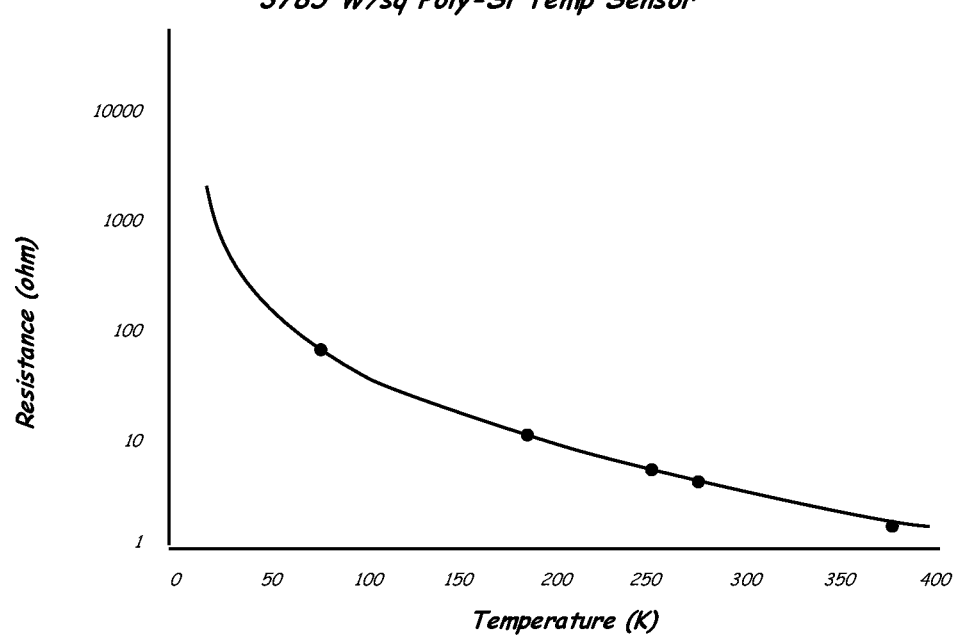
FIG. 7 is a graph of resistance vs. temperature for a cryogenic temperature sensor.

A sensor 30 design is shown in FIG. 6 and uses the 3500 ohm/sq polysilicon discussed above. Sensor 30 includes a polysilicon resistive layer 62 which is 1 micron thick and 1 millimeter wide, and metal conductors 64 fabricated from aluminum or chrome, for example. The conductors 64 connect individual polysilicon resistors 62 together in parallel and to electrical connection pads 66. These components are deposited on a silicon substrate 68. In order to lower the overall resistance to be compatible with temperature transmitter 12, sensor 30 uses 20 polysilicon resistors connected in parallel, resulting in a Ro value of 4 ohms and a resistance at 18K of 2,000 ohms. FIG. 7 shows the resistance vs. temperature curve for this sensor. Thus, the configuration provides a cryogenic temperature sensor which uses a polycrystalline silicon sensor doped such that it has an electrical resistance which changes over a cryogenic temperature range which is within a sensor resistance measurement range of the resistance measurement circuitry of transmitter 12.

By modifying the sheet resistance of the polysilicon, the thickness of the polysilicon layer, and the number of parallel polysilicon resistive elements, a temperature transmitter is provided which uses a polysilicon temperature sensor which operates at temperatures from that of liquid helium up to 470 K.

Figures 8A, 8B:
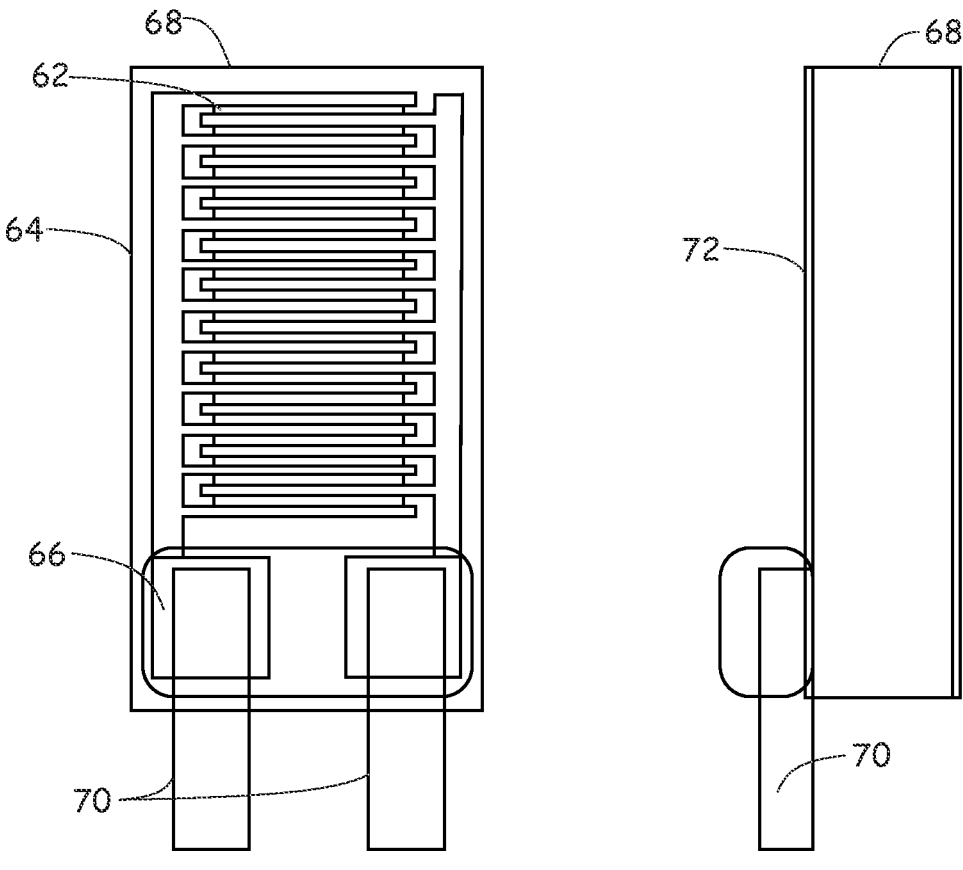
FIG. 8A and FIG. 8B a respective plan and side views of the cryogenic temperature sensor of FIG. 6 encased in a protective layer.

The polysilicon temperature sensor design can be packaged by adding a layer 72 of thick photo resist (such as Polyimide or SU-8) to protect the sensor element. A window can be opened in the thick photo resist for soldering on two leads 70 to pads 66, that can in turn be welded to lead wires in a temperature sensor capsule. This is shown in FIG. 8A and FIG. 8B.

Applying the thick photoresist at wafer level provides an inexpensive protection layer for the temperature sensor 30, leaving only the sensor leads 70 to be attached to each individual sensor.

Figure 9:
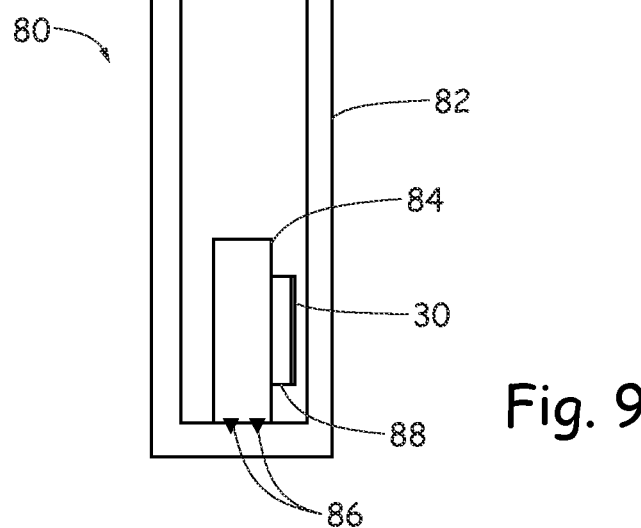
FIG. 9 is a side cross sectional view of a temperature sensor capsule including a cryogenic temperature sensor.

Traditional temperature sensor capsule designs work well, but places a ceramic layer between the sensor element and the process requiring temperature measurement. The relatively low thermal conductance of the ceramic results in a long response time for the temperature sensor. FIG. 9 is a cross sectional view of a temperature sensor capsule 80 in which a metal probe housing 82 carries a Niobium support 84 having Niobium projections 86 welded to housing 82. Housing 82 can comprise, for example, stainless steel. Sensor 30 is mounted to support 84 using substrate 88 formed of single crystal Sapphire or Alumina. Other example materials for support 84 include Kovar and Invar.

In the configuration of FIG. 9, strain gauge material, either polysilicon or Tantalum, is deposited on a Single Crystal Sapphire or Alumina substrate 88. The Alumina or Sapphire can be diffusion-bonded to Niobium through a process known as hot-pressing. This joining method creates a high-strength hermetic bond between the joining materials. While this process is typically performed at temperatures near 1100° C., very little mechanical stress is created from the bonding process. This is due to the near identical coefficient of thermal expansion (CTE) between the two materials. Such solid-state bonding of the Sapphire or Alumina substrate 88 resolves mechanical creep challenges faced with eutectic solder and enables higher temperature ranges. Additionally, the solid-state bond creates an efficient thermal conduction path between the sensor substrate 88 and the mounting material, improving time response performance. Furthermore, because single crystal Sapphire or Alumina are electrical insulators, the temperature sensor is electrically isolated from the stainless-steel probe housing 82. Substrate 88 provides an intermediate material layer and can be configured to have a coefficient of thermal expansion which is similar to the silicon substrate of the sensor 30. The attachment can be, for example, through brazing or eutectic solder. The support 84 can also be configured as such an intermediate layer. In another configuration, the silicon substrate can be bonded to a dielectric material, such as glass, through, for example, glass-frit bonding. Anodic bonding can also be used for bonding a borosilicate glass dielectric material to the silicon substrate. Alumina ceramic can also provide a dielectric substrate.

The Niobium support 84 is affixed to the temperature probe housing 82. One efficient method for doing so is through projection welding. This joining method creates a robust connection between the sensor sub-assembly and the probe housing 82, while also enabling efficient heat transfer.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art. As used herein, cryogenic refers to temperature below 150° C. This invention provides a temperature sensor designed for cryogenic applications that costs less than silicon diodes and has a customizable response to temperature, unlike many typical RTD's. The temperature sensor set forth herein can be optimized to work with commonly available temperature transmitters as well.

What is claimed is:

1. A process variable transmitter for sensing a cryogenic temperature in an industrial process, comprising:

a cryogenic temperature sensor configured to be thermally coupled to an industrial process, the cryogenic temperature sensor having an electrical resistance which changes in response to changes in a cryogenic temperature, wherein the industrial process is at the cryogenic temperature;

resistance measurement circuitry electrically coupled to the cryogenic temperature sensor, the resistance measurement circuitry configured to measure a sensor resistance over a sensor resistance range and responsively provide an output related to temperature based upon the measured resistance; and transmitter output circuitry coupled to the measurement circuitry configured to transmit information related to the cryogenic temperature to a remote location;

wherein the cryogenic temperature sensor comprises a polycrystalline silicon sensor including a dopant such that the cryogenic temperature sensor has an electrical resistance which changes over a cryogenic temperature range which is within the sensor resistance range of the measurement circuitry.

2. The process variable transmitter of claim 1 wherein the cryogenic temperature sensor comprises a doped polysilicon film carried on a single crystal silicon substrate.

3. The process variable transmitter of claim 2 wherein the silicon substrate is attached to an intermediate material that has similar coefficient of thermal expansion.

4. The process variable transmitter of claim 3 wherein the intermediate material is attached to a metal housing.

5. The process variable transmitter of claim 4 wherein the intermediate material is joined to the metal housing by brazing.

6. The process variable transmitter of claim 5 wherein the intermediate material is joined to the metal housing by projection welding.

7. The process variable transmitter of claim 6 wherein the silicon substrate is attached to the intermediate material by brazing.

8. The process variable transmitter of claim 7 wherein the silicon substrate is attached to the intermediate material by eutectic solder.

9. The process variable transmitter of claim 3 wherein the intermediate material is selected from the group of materials comprising Kovar, Invar and Niobium.

10. The process variable transmitter of claim 2 wherein the silicon substrate is bonded to a dielectric material.

11. The process variable transmitter of claim 10 wherein the dielectric material comprises glass.

12. The process variable transmitter of claim 10 wherein the silicon substrate and the dielectric are bonded by glass-frit bonding.

13. The process variable transmitter of claim 10 wherein the silicon substrate and the dielectric are bonded by anodic bonding.

14. The process variable transmitter of claim 10 wherein dielectric material is bonded to an intermediate material.

15. The process variable transmitter of claim 1 wherein the dopant comprises phosphorus.

16. The process variable transmitter of claim 1 wherein a dopant level in the polycrystalline silicon is selected to provide a desired resistance response over the cryogenic temperature range.

17. The process variable transmitter of claim 16 wherein sensor resistance range is for an RTD (Resistance Temperature Detector) selected from the group of RTDs consisting of Platinum RTDs, Nickel RTDs and Copper RTDs.

18. The process variable transmitter of claim 1 wherein the cryogenic temperature sensor comprises a polycrystalline silicon film protected by a polymer layer.

19. The process variable transmitter of claim 18 wherein the polymer layer comprises polyimide.

20. The process variable transmitter of claim 18 wherein the polymer layer comprises SU-8.

21. The process variable transmitter of claim 1 including electrical leads coupled to the cryogenic temperature sensor.

22. The process variable transmitter of claim 1 wherein the cryogenic temperature sensor is deposited on a dielectric substrate.

23. The process variable transmitter of claim 22 wherein the dielectric substrate material comprises Alumina ceramic.

24. The process variable transmitter of claim 22 wherein the dielectric substrate is diffusion bonded to an intermediate material.

25. The process variable transmitter of claim 1 wherein the dopant is selected from the group of dopants consisting of arsenic, antimony, bismuth, and lithium.

26. The process variable transmitter of claim 1 wherein the dopant is selected from the group of dopants consisting of boron, aluminum, gallium, and indium.

*    *    *    *    *